United States Patent
Kang et al.

(10) Patent No.: US 11,623,528 B2
(45) Date of Patent: Apr. 11, 2023

(54) MOTOR DRIVING CONTROL METHOD AND SYSTEM

(71) Applicants: Hyundai Motor Company, Seoul (KR); Kia Motors Corporation, Seoul (KR)

(72) Inventors: Min Su Kang, Paju-si (KR); Chang Seok You, Hwaseong-si (KR); Sung Do Kim, Seoul (KR); Dong Hun Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 172 days.

(21) Appl. No.: 16/922,442

(22) Filed: Jul. 7, 2020

(65) Prior Publication Data

US 2021/0146783 A1 May 20, 2021

(30) Foreign Application Priority Data

Nov. 15, 2019 (KR) .......................... 10-2019-0146435

(51) Int. Cl.
*B60L 15/08* (2006.01)
*B60L 50/71* (2019.01)
*B60W 10/28* (2006.01)
*H01M 8/04537* (2016.01)
*H01M 8/04858* (2016.01)

(52) U.S. Cl.
CPC .............. *B60L 15/08* (2013.01); *B60L 50/71* (2019.02); *B60W 10/28* (2013.01); *H01M 8/0488* (2013.01); *H01M 8/04559* (2013.01); *B60W 2510/083* (2013.01); *B60W 2710/083* (2013.01); *B60W 2710/285* (2013.01); *H01M 2250/20* (2013.01)

(58) Field of Classification Search
CPC ......... B60L 15/08; B60L 50/71; B60W 10/28; H01M 2250/20
See application file for complete search history.

(56) References Cited

U.S. PATENT DOCUMENTS

| | | | | |
|---|---|---|---|---|
| 5,146,146 | A * | 9/1992 | Samann | H02P 27/026 318/768 |
| 8,054,031 | B2 * | 11/2011 | Uechi | B60K 6/445 318/376 |
| 8,796,970 | B2 * | 8/2014 | Aarestrup | H02P 25/20 318/400.26 |

(Continued)

FOREIGN PATENT DOCUMENTS

| | | |
|---|---|---|
| KR | 20140073735 A | 6/2014 |
| KR | 20150026265 A | 3/2015 |
| KR | 101988088 B1 | 6/2019 |

*Primary Examiner* — Daniel L Greene
(74) *Attorney, Agent, or Firm* — Slater Matsil, LLP

(57) ABSTRACT

A motor driving control method for controlling a motor speed so that a speed measured value of a motor follows a speed command value is provided. The method includes driving the motor by repeating an on section where a torque is generated in the motor and an off section where a torque is not generated in the motor at a regular period, based on the speed command value, wherein the driving includes applying a phase voltage to only one of multiple phases of the motor in the on section by a pulse width modulation scheme.

16 Claims, 7 Drawing Sheets

(56) References Cited

U.S. PATENT DOCUMENTS

| | | | | |
|---|---|---|---|---|
| 2003/0020429 | A1* | 1/2003 | Masaki | H02P 6/18 318/727 |
| 2006/0006832 | A1* | 1/2006 | Kitajima | B60L 58/40 318/800 |
| 2007/0046249 | A1* | 3/2007 | Tomigashi | H02P 21/18 318/807 |
| 2008/0252250 | A1* | 10/2008 | Hida | H02P 25/00 318/801 |
| 2010/0060211 | A1* | 3/2010 | Hashimoto | H02P 27/08 318/400.02 |
| 2012/0217849 | A1* | 8/2012 | Aoki | B60L 15/20 310/68 D |
| 2012/0268046 | A1* | 10/2012 | Yamazaki | H02P 21/26 318/400.02 |
| 2014/0157819 | A1 | 6/2014 | Koo et al. | |
| 2014/0333241 | A1* | 11/2014 | Zhao | H02P 27/08 318/400.02 |
| 2017/0110999 | A1* | 4/2017 | Shimada | H02P 27/06 |
| 2018/0118032 | A1 | 5/2018 | Lee et al. | |

* cited by examiner

MOTOR DRIVING CONTROL METHOD AND SYSTEM

CROSS-REFERENCE TO RELATED APPLICATIONS

This application claims priority to Korean Patent Application No. 10-2019-0146435, filed on Nov. 15, 2019, which application is hereby incorporated herein by reference.

TECHNICAL FIELD

The present invention relates to a motor driving control method and system.

BACKGROUND

In fuel cell vehicles, the operating temperature of the fuel cell stack rises under operating conditions where cooling performance is low when the fuel cell stack is operated at high power, such as during a high temperature climbing operation, so that the feed fuel drops in humidity and thus the fuel cell stack becomes dried out, thereby causing the stack operating voltage at the same current to drop. Herein, a vicious cycle may occur in which the stack voltage drop leads to further increasing of the fuel cell operating temperature while increasing the heat generation amount of the fuel cell stack.

In order to prevent such a vicious cycle in which the fuel cell operating temperature increases, a control technology for increasing the relative humidity of the cathode side by increasing the pressure of air supplied to the cathode has been applied to a vehicle fuel cell system. Accordingly, it is necessary to further increase a compression ratio of the air compressor that supplies the air to the cathode of the fuel cell stack.

Since it is necessary to further increase the compression ratio of the air supplied to the cathode side of the fuel cell stack, the air compressor is designed so that the compression ratio of the air compressor is further increased and the maximum efficiency point is displayed at the maximum pressure operating point. Such a design is such that the compressor efficiency is increased in the high flow rate compression ratio section, but a problem is caused in that the efficiency decreases in the relatively low flow rate section. Accordingly, when driving a vehicle in the city center, the air compressor power consumption is increased in the low flow rate region, which is the main driving region, which adversely affects the fuel efficiency of the vehicle.

More specifically, since the pressurized air compressor, which further improves the air compression ratio compared to the atmospheric air blower used in the related art, should further increase the driving speed of the built-in motor, the difference in the driving speed of the motor increases between the low flow rate section and the high flow rate section, whereby there is a disadvantage that it is difficult to improve the efficiency of the air compressor itself. That is, the pressurized air compressor reduces the motor inductance in order to secure sufficient voltage margin in the high-speed operation region as the motor rotation speed increases, and the reduction of the motor inductance causes increases in the three-phase ripple current, thereby reducing the efficiency of the motor/inverter. In particular, in the low flow rate section requiring a relatively small output, the three-phase current is small and the efficiency reduction effect is remarkable due to the increase in current ripple. That is, the three-phase ripple current does not contribute to the motor torque as a secondary component, and the three-phase ripple current amount is relatively large compared to the three-phase sine wave current component in the low flow section where the motor torque is small, whereby the motor/inverter efficiency is reduced compared to the high output section.

In addition, an airfoil bearing is used to rotate the motor of the air compressor for high speed rotation, in which the airfoil bearing requires rotation that is higher than a reference speed in order to maintain a lift state. Therefore, when the airfoil bearing continuously drives the motor at a reference speed or less for maintaining the lift state, there is a problem in that the airfoil bearing may be burned out due to friction with the motor shaft. Therefore, in order to prevent such airfoil bearings from being burned out, the air compressor has a minimum driving speed limit. Accordingly, even when the fuel cell needs to be operated at a low power, the air compressor is driven at a minimum driving speed or higher so that unnecessary air supply may not be avoided, whereby the efficiency of the fuel cell system itself is reduced.

In order to solve problems, a technique for performing on/off control of the motor torque in a low speed region has been proposed in Korean Patent No. 10-1988088 (Applicant: Hyundai Motor Co., Ltd.). According to this related patent, at a drive torque on state of a motor, the inverter applies a control method of applying all phase switches of the motor by controlling all phase switches of the motor with the pulse width modulation duty determined by the controller, in order to apply the three-phase voltage of the motor. The control method of the related patent has a torque off section as compared to the usual method of controlling the torque of the motor at all times, so that an inverter switching loss, a conduction loss, and a current ripple loss can be prevented, thereby improving efficiency.

The matters described as the background art are only for the purpose of improving the understanding of the background of the present invention, and should not be taken as acknowledging that they correspond to the related art already known to those skilled in the art.

SUMMARY

The present invention relates to a motor driving control method and system. Particular embodiments relate to a motor driving control method and system capable of significantly improving the efficiency of a motor by reducing current ripple loss and switching loss of an inverter in a low speed drive section of a high speed motor.

Embodiments of the present invention have been made keeping in mind problems occurring in the related art, and embodiments of the present invention provide a motor driving control method and system that can maximize reduction in the switching loss and current ripple loss of an inverter, by controlling a motor designed to produce maximum efficiency at high speeds so that an on section where motor torque is generated at low speed and an off section where motor torque is not generated are repeated while controlling an inverter switching element so that only a phase voltage corresponding to one phase of the motor is applied in the on section.

An embodiment of the present invention provides a motor driving control method controlling a motor speed so that a speed measured value of a motor follows a speed command value, the method including driving the motor by repeating an on section where a torque is generated in the motor and an off section where a torque is not generated in the motor at a regular period, based on the speed command value, wherein the driving includes applying a phase voltage to only one of multiple phases of the motor in the on section by a pulse width modulation scheme.

According to an embodiment of the present invention, the driving may include performing control so that phases to which a phase voltage is not applied, among the multiple phases of the motor, are always-on or always-off, in the on section.

According to an embodiment of the present invention, a start point and an end point of the on section may be determined before and after a time point when a q-axis in a rotating coordinate system of the motor meets an axis corresponding to one phase to which the phase voltage is applied in a fixed coordinate system, respectively.

According to an embodiment of the present invention, the driving may include determining a target phase corresponding to one phase to which a phase voltage is to be applied in the on section, among the multiple phases of the motor, checking whether a q-axis in a rotating coordinate system of the motor approaches an axis corresponding to the target phase in a fixed coordinate system, and applying the phase voltage only to the target phase by a pulse width modulation scheme for a time corresponding to the predetermined on section, when it is determined that the q-axis in the rotating coordinate system of the motor approaches, to a predetermined angle, the axis corresponding to the target phase in the fixed coordinate system in the checking.

According to an embodiment of the present invention, the applying may include performing control so that remaining phases other than the target phase are always-on or always-off for a time corresponding to the on section.

According to an embodiment of the present invention, a start point and an end point of the on section may be determined before and after a time point when a q-axis in a rotating coordinate system of the motor meets an axis corresponding to one phase to which the phase voltage is applied in a fixed coordinate system, respectively.

According to an embodiment of the present invention, the driving may include performing control so that a driving current provided to the motor is substantially zero in the off section.

According to an embodiment of the present invention, the driving may include turning off a switching element included in an inverter providing the driving current to the motor in the off section.

According to an embodiment of the present invention, the driving may include controlling a switching element included in an inverter applying a driving voltage to the motor so that the driving voltage applied to the motor in the off section is substantially equal to a counter electromotive force of the motor.

In addition, embodiments of the present invention provide a motor driving control system, including a speed controller determining a current command value for a driving current for driving a motor so that a speed measured value of the motor follows a speed command value for the motor, a current controller determining a voltage command value for driving the motor so that a motor driving current measured value of an inverter actually provided to the motor follows the current command values, a voltage output converter converting the voltage command value and performing on/off control of a switching element included in the inverter based on the voltage command value, and a torque on/off determiner determining whether to perform a torque on/off mode for driving the motor by repeating an on section where a torque is generated in the motor and an off section where a torque is not generated in the motor at a regular period, wherein when the torque on/off determiner determines that the torque on/off mode is performed, the voltage output converter controls the inverter so that a phase voltage is applied to only one phase of multiple phases of the motor by a pulse width modulation scheme in the on section.

According to an embodiment of the present invention, when the torque on/off determiner determines that the torque on/off mode is performed, the voltage output converter may control the inverter so that phases to which a phase voltage is not applied, among the multiple phases of the motor, are always-on or always-off, in the on section.

According to an embodiment of the present invention, a start point and an end point of the on section may be determined before and after a time point when a q-axis in a rotating coordinate system of the motor meets an axis corresponding to one phase to which the phase voltage is applied in a fixed coordinate system, respectively.

According to an embodiment of the present invention, when the torque on/off determiner determines that the torque on/off mode is performed, for a determined time corresponding to the on section starting from a point time when a q-axis in a rotating coordinate system of the motor approaches, to a predetermined angle, an axis corresponding to a target phase corresponding to one phase to which a phase voltage is applied in the on section in a fixed coordinate system, the voltage output converter may control the switching element included in the inverter so that a phase voltage is applied only to the target phase by a pulse width modulation scheme.

According to an embodiment of the present invention, when the torque on/off determiner determines that the torque on/off mode is performed, the voltage output converter may control a switching element included in the inverter so that a driving current provided to the motor in the off section becomes substantially zero.

According to an embodiment of the present invention, when the torque on/off determiner determines that the torque on/off mode is performed, the voltage output converter may turn off the switching element included in the inverter in the off section.

According to an embodiment of the present invention, when the torque on/off determiner determines that the torque on/off mode is performed, the voltage output converter may control the switching element included in the inverter so that the driving voltage applied to the motor in the off section becomes substantially equal to a counter electromotive force of the motor.

According to an embodiment of the present invention, when the torque on/off determiner determines that the torque on/off mode is performed, the speed controller may determine the current command values to be zero when the torque of the motor is off.

According to an embodiment of the present invention, when the speed command values or the current command values are within the predetermined range, the torque on/off determiner may determine that the torque on/off mode is performed.

According to the motor driving control method and system, it is possible to improve the efficiency of the system to which the motor is applied by reducing the power consumption of the motor. In particular, in a fuel cell vehicle including an air compressor to which the motor is applied, fuel cell system efficiency and vehicle fuel economy may be improved by reducing power consumption by the air compressor.

In addition, according to the motor driving control method and system, no cost is incurred due to the addition of additional hardware, and the power consumption of the motor can be easily reduced by performing on/off control of the motor torque in a specific speed section or a specific torque section.

In particular, according to the motor driving control method and system, when performing the on/off control of the motor torque, only one phase is used among multiple phases of the motor and the maximum torque is obtained in the corresponding phase in the on section where motor torque is generated, thereby ensuring the reduction in switching loss and current ripple loss of the inverter.

Further, according to the motor driving control method and system, the efficiency can be improved not only in the constant speed driving state but also in the acceleration/deceleration driving state of the motor.

The effects obtained in embodiments of the present invention are not limited to the above-mentioned effects, and other effects not mentioned above may be clearly understood by those skilled in the art from the following description.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF ILLUSTRATIVE EMBODIMENTS

Hereinafter, a motor driving control method and system according to exemplary embodiments of the present invention will be described with reference to the accompanying drawings.

Figure 1:
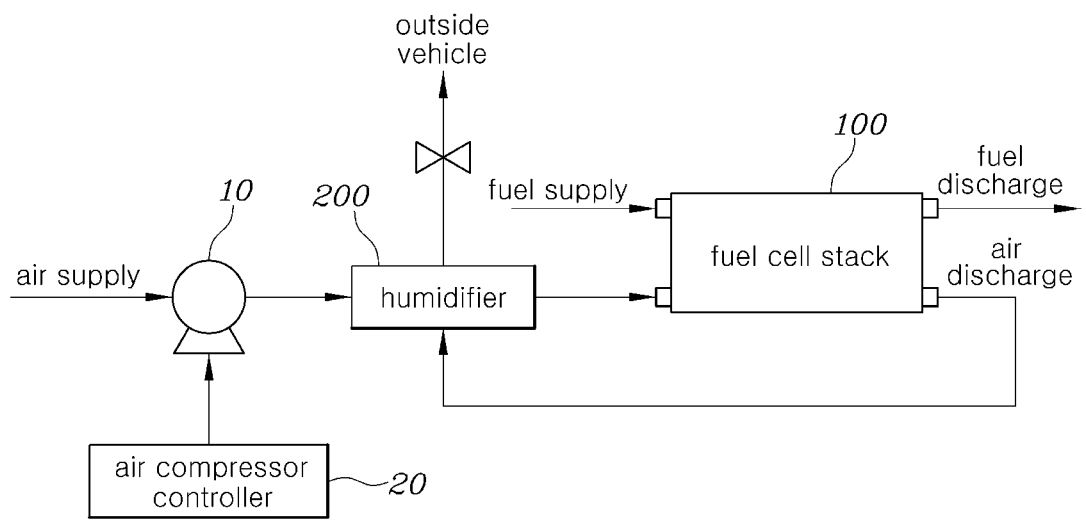
FIG. 1 is a block diagram schematically illustrating an example of a fuel cell system to which a motor driving control method and system is applied according to an embodiment of the present invention.

FIG. 1 is a block diagram schematically illustrating an example of a fuel cell system to which a motor driving control method and system is applied according to an embodiment of the present invention.

As shown in FIG. 1, the fuel cell system may include a fuel cell stack 100 including a fuel cell that receives hydrogen as a fuel and air as an oxidant to generate electric power through an oxidation/reduction action, an air compressor 10 that supplies compressed air to a cathode of the fuel cell stack 100, and a humidifier 200 that supplies moisture to the compressed air of the air compressor 10 to deliver the same to the fuel cell stack 100. Here, the humidifier 200 receives unreacted air of high humidity discharged from the fuel cell stack 100 to provide moisture to the air supplied to the fuel cell stack 100.

As already described in the background art, in order to prevent drying of hydrogen due to heat generation of the fuel cell stack when a high power is required in the fuel cell stack 100, the compression ratio of the air supplied to the fuel cell stack 100 is increased. That is, the flow rate of the air is increased by operating the air compressor 10 at a higher speed, so that the humidified air is further provided to the fuel cell stack 100, thereby avoiding the drying phenomenon.

In order to implement the control of the air compressor 10, the fuel cell system may be provided with a controller 20 for controlling the air compressor 10, more precisely, a motor 10 included in the air compressor 10.

In the description of various embodiments of the present invention, a motor control method implemented in the controller 20 for controlling the motor of the air compressor 10 included in the fuel cell system, and a motor control system including the air compressor 10 and the controller 20 are used as an application example. However, the description of the application example is not limited to the air compressor of the fuel cell system, and the teachings of the present invention may be widely applied to the control of various motors applied to other technical fields other than the fuel cell field.

Figure 2:
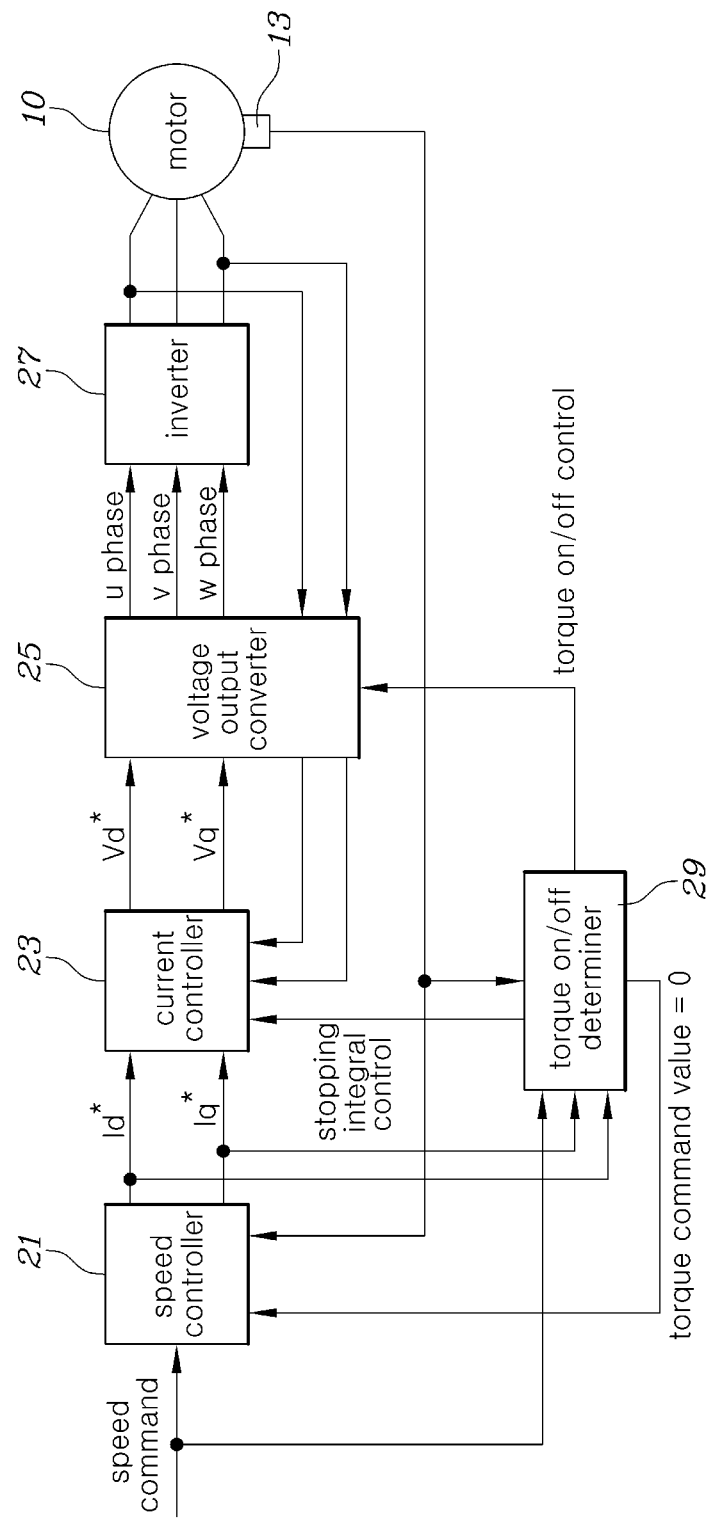
FIG. 2 is a block diagram illustrating a motor driving control system according to an embodiment of the present invention.

FIG. 2 is a block diagram illustrating a motor driving control system according to an embodiment of the present invention.

Referring to FIG. 2, a motor driving control system according to an embodiment of the present invention may be configured to include a speed controller 21, a current controller 23, a voltage output converter 25, an inverter 27, and a torque on/off determiner 29. In FIG. 2, the motor is referred to as a reference numeral '10' that is the same as that of the air compressor of FIG. 1. This is because various embodiments of the present invention are for controlling the driving of the motor, and particularly for controlling the driving of the motor included in an air compressor in the fuel cell system, so that controlling the air compressor can be understood to mean substantially the same as controlling the motor of the air compressor. In addition, controlling the air compressor throughout the present specification may be understood to mean controlling the motor of the air compressor.

The speed controller 21 receives a speed command for controlling the speed of the motor from a host controller (not shown), and generates and outputs current command values (Id*, Iq*) of driving current for driving the motor on the basis of the motor speed actual value obtained by actually detecting the speed of the motor. Here, the host controller may be a controller for controlling the fuel cell system or a vehicle controller for controlling a vehicle to which the fuel cell system is applied. The host controller may determine the output of the fuel cell stack 100 on the basis of the vehicle speed, the climbing angle of the vehicle, the opening degree of the accelerator operated by the driver, and the like, and may determine the rotation speed of the motor in consideration of the output and temperature of the fuel cell stack 100. The host controller provides the speed controller 21 with the determined rotation speed of the motor as speed commands.

The speed controller 21 compares the input speed command value with the motor speed measured value corresponding to the motor's actual rotation speed, to generate and output the current command values Id* and Iq* so that the rotational speed of the motor may follow the speed command value.

Herein, the current command values (Id*, Iq*) are command values for the driving current of the motor 10. In general, in controlling the motor, the target torque of the motor is set and the driving current of the motor is controlled so that the motor follows this target torque. Since embodiments of the present invention are applied to controlling the speed of the motor, the speed controller 21 determines a target torque at which the speed measured value may follow the speed command values on the basis of the speed measured value and the speed command values and generates current command values corresponding to the target torque, in order to control the motor to follow the target speed command value. More specifically, the current command values (Id*, Iq*) output from the speed controller 21 may be d-axis and q-axis current command values of the motor.

The speed controller 21 may be applied with a control technique that accumulates differences between command values and measured values through a process of integrating errors between command values and measured values, such as a proportional integral (PI) controller, for reflection in the control amount. That is, the speed controller 21 may be applied with a control technique that integrates differences between speed commands and actual speeds of the motor 10 for reflection. In addition to the PI control technique, the speed controller 21 may be applied with techniques such as proportional integral differential (PID) control, integral proportional (IP) control, or IP-PI mixed control.

Meanwhile, the motor 10 is provided with a sensor 13, such as a Hall sensor or resolver for detecting the position of the motor rotor. The measured speed value obtained by detecting the actual rotation speed of the motor 10 by the sensor 13 is provided to the speed controller 21, thereby generating the current command values.

The current controller 23 performs control so that the current supplied from the inverter 27 to the motor follows the current command values (Id*, Iq*) to output the d-axis and q-axis voltage command values (Vd*, Vq*). The current controller 23 detects some or all of currents of each phase provided from the inverter 27 to the motor 10, and performs control so that the driving current measured values converted into d-axis current and q-axis current are fed back and the driving current measured value follows the current command values, i.e., d-axis and q-axis current command values (Id*, Iq*).

Like the speed controller 21 described above, the current controller 23 may use a control technique including an integration process for accumulating differences between the actual current provided from the inverter 27 to the motor and the current command values (Id*, Iq*), such as PI control, PID control, IP control, IP-PI mixed control, etc.

A voltage output converter 25 converts the d-axis and q-axis voltage command values (Vd*, Vq*) into three-phase voltage command values through coordinate transformation (DQ↔three-phase (abc)), and generates a driving signal for driving a switching element in the inverter 27 on the basis of the transformed three-phase voltage command values and then provides the same to the inverter 27. As the switching of the switching elements in the inverter 27 is controlled by the driving signal, the inverter 27 outputs a three-phase current for driving the motor 10.

In addition, the voltage output converter 25 may convert the measured value of the three-phase driving current of the inverter 27 fed back for the control in the current controller 23 into the DQ current back to provide the same to the current controller 23.

In particular, when it is determined that it is necessary to control the motor 10 in a torque on/off mode in which an on-section where the torque of the motor 10 is generated and an off-section where the torque is not generated are repeated at a regular period, the voltage output converter 25 may control the motor 10 such that a predetermined time interval of the on-section and the off-section is repeated. Whether to enter the torque on/off mode may be performed by the torque on/off determiner 29.

The torque on/off determiner 29 receives the speed command values provided to the speed controller 21 or the current command values (Id*, Iq*) generated by the speed controller 21, and the speed command values or current command values, and determines that torque on/off is performed when the speed command values or the current command values (Id*, Iq*) are within a predetermined ranges When the torque on/off determiner 29 determines that the torque on/off of the motor 10 needs to be repeatedly performed, the determination result by the torque on/off determiner 29 may be provided to the voltage output converter 25 and the current controller 23. The voltage output converter 25 receiving the determination result of the torque on/off determiner 29 transmits a signal for controlling a switching element in the inverter 27 to the inverter 27 so that the torque of the motor 10 is turned on/off. In addition, the current controller 23 receiving the commands from the torque on/off determiner 29 enables appropriate control in the torque off section.

The torque on/off control of the motor will be more clearly understood through the description of the motor driving control method according to an embodiment of the present invention which will be described later.

Figure 3:
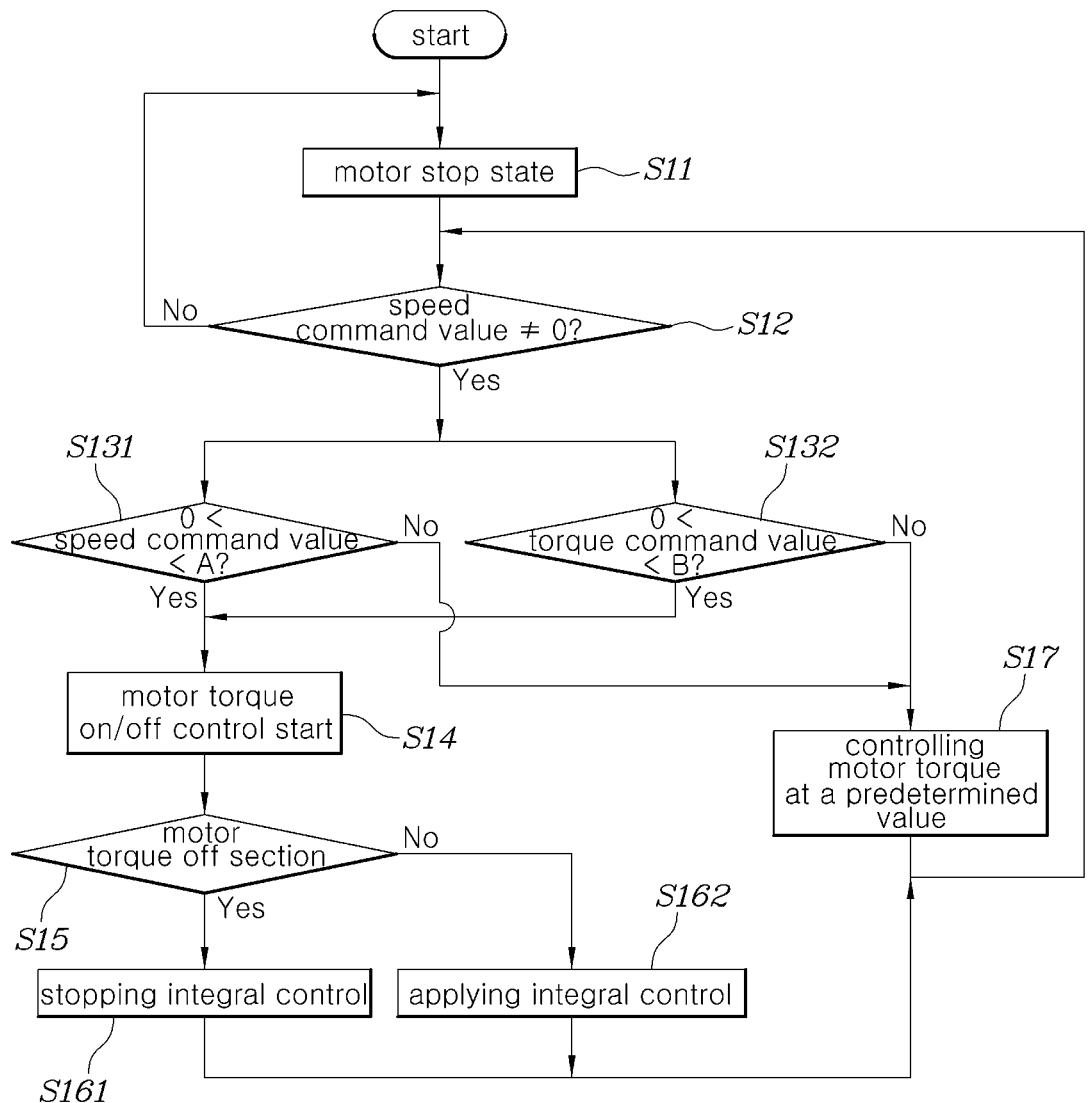
FIG. 3 is a flowchart illustrating a motor driving control method according to an embodiment of the present invention.

FIG. 3 is a flowchart illustrating a motor driving control method according to an embodiment of the present invention. The embodiment shown in FIG. 3 relates to an example of performing on/off control of motor torque when the speed command values or current command values of the motor are within a predetermined range. A feature of embodiments of the present invention is associated with applying a torque on/off mode in which an on-section where a motor torque is generated and an off-section where a motor torque is not generated are repeated at a regular period. The features of the embodiments of the present invention are not limited to the specific conditions used in the example shown in FIG. 3 and may be applied to motor driving regardless of the magnitude of the speed command values or the current command values.

Referring to FIG. 3, in the case that the motor 10 is in a stop state (S11), when a speed command value other than zero is input to the speed controller 21 (S12), the control for generating the motor torque is started.

When the speed command values are input to the speed controller 21, the speed controller 21 derives the current command values (Id*, Iq*) for performing control so that the rotation speed measured value of the motor 10 follows the speed command values and outputs the same to the current controller 23. The current controller 23 derives and outputs the voltage command values (Vd*, Vq*) such that the current measured values corresponding to the values directly detected by the inverter 27 from the inverter 27 to the motor 10 follow the current command values (Id*, Iq*). The voltage output converter 25 converts the voltage command values (Vd*, Vq*) of DQ coordinates to three-phase (u-phase, v-phase, and w-phase) voltage and generates a PWM switching signal for controlling a switching element in the inverter 27 and outputs the same to the inverter 27 so that each of the three-phase voltages may be output.

The driving of the motor is started through such a series of processes. The motor driving control method according to an exemplary embodiment of the present invention monitors the speed command values or the current command in the torque on/off determiner 29 after the driving of the motor 10 is started, thereby determining whether to perform the torque on/off mode (S131, S132). That is, the torque on/off determiner 29 may determine that the torque on/off mode is performed when the speed command values are within a predetermined range (greater than zero and smaller than A (positive number) in FIG. 3) (S131), and the current command values are within a preset range (greater than zero and less than B (positive) in FIG. 3) (S132). The ranges are predetermined to correspond to sections of low rotation speed or low torque in which the efficiency decreases, in consideration of the fact that high-speed air compressors rapidly deteriorate in efficiency at sections of low rotation speeds or low torque as described in the background art. However, according to another embodiment of the present invention, the torque of the motor may be controlled to be turned on/off in the entire torque and speed range in which the motor can be driven regardless of the above-mentioned ranges.

When the torque on/off determiner 29 determines that the torque on/off mode should be performed, the torque on/off determiner 29 may instruct the voltage output converter 25 outputting a driving signal for controlling on/off of a switching element included in the inverter 27 to perform the torque on/off mode, and the voltage output converter 25 may control the switching element in the inverter 27 according to this instruction (S14).

Figure 4:
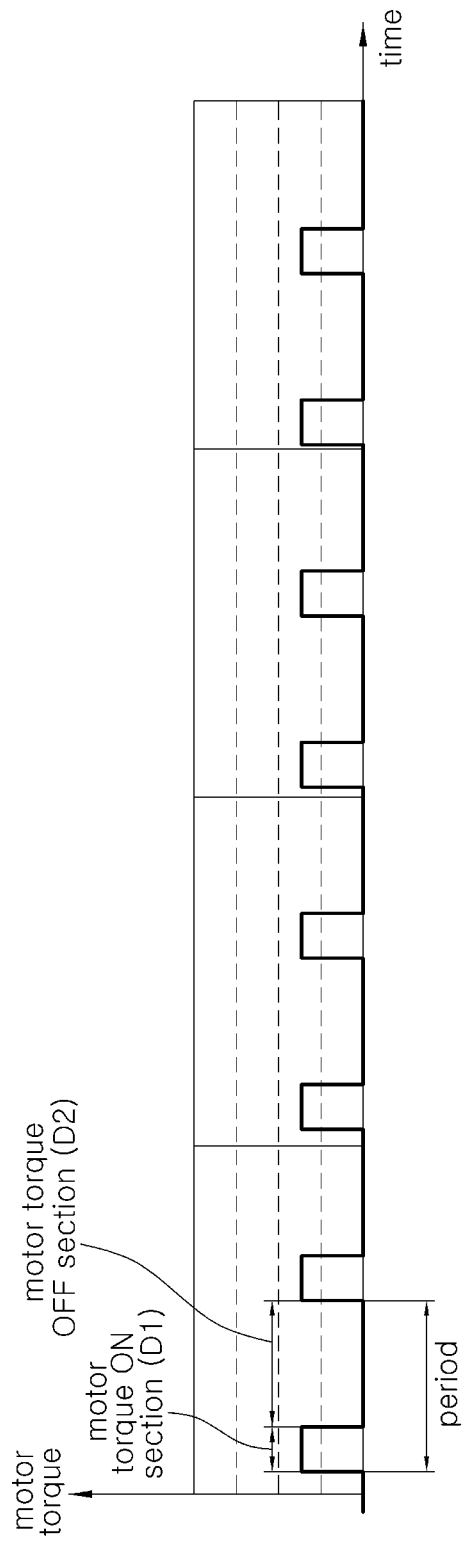
FIG. 4 is a graph illustrating an on/off control state of motor torque applied to a motor driving control method according to an embodiment of the present invention.

FIG. 4 is a graph illustrating an on/off control state of motor torque applied to a motor driving control method according to an embodiment of the present invention.

As shown in FIG. 4, according to an embodiment of the present invention, a torque on/off mode may be performed in which an on section D1 where the motor torque is generated and an off section D2 where the motor torque is not generated are repeated at a regular period, in step S14 of FIG. 3. A time interval of the on section D1, a time interval of the off section D2, and a period in which the on section D1 and the off section D2 are repeated may be determined through an experimental method in advance, as a value capable of minimizing the inverter power consumption and ensuring the operation stability for each motor speed.

Such torque on/off mode is preferably applied under a condition in which the speed change is not large even though the load affecting the motor 10 is small and thus the motor 10 is driven by inertia. When the load of the motor 10 is large, since the deceleration is largely generated in a section in which the torque is turned off, an unnecessary energy loss may occur while acceleration/deceleration of the motor speed is greatly generated due to the torque on/off repetition. Therefore, when the motor load is large, the effectiveness of the torque on/off repetition control is remarkably reduced. In particular, when the amount of acceleration/deceleration of the motor speed due to the torque on/off control exceeds a certain level, there is a problem that the power consumption of the motor 10 is increased.

In addition, as the rotational inertia moment of the motor 10 increases, the effect of on/off control on the motor torque may increase. That is, when the rotational inertia momentum of the motor 10 is large, the speed fluctuation is small even in the torque off section, whereby the efficiency of torque on/off control may increase.

According to an embodiment of the present invention, as a specific technique of performing repetitive on/off control of the motor torque, the phase voltage is applied to only one of multiple phases of the motor 10 by a pulse width modulation scheme in the on section D1 where the motor torque is generated. When applying the phase voltage to only one phase rather than applying the phase voltages to all the multiple phases of the motor in the on section D1, it is possible to relatively reduce the frequency of switching of the switching element in the inverter 27. Instead, since only one phase is used to drive the motor, it is preferable to perform control so that the maximum torque is generated in the corresponding phase.

Figure 5:
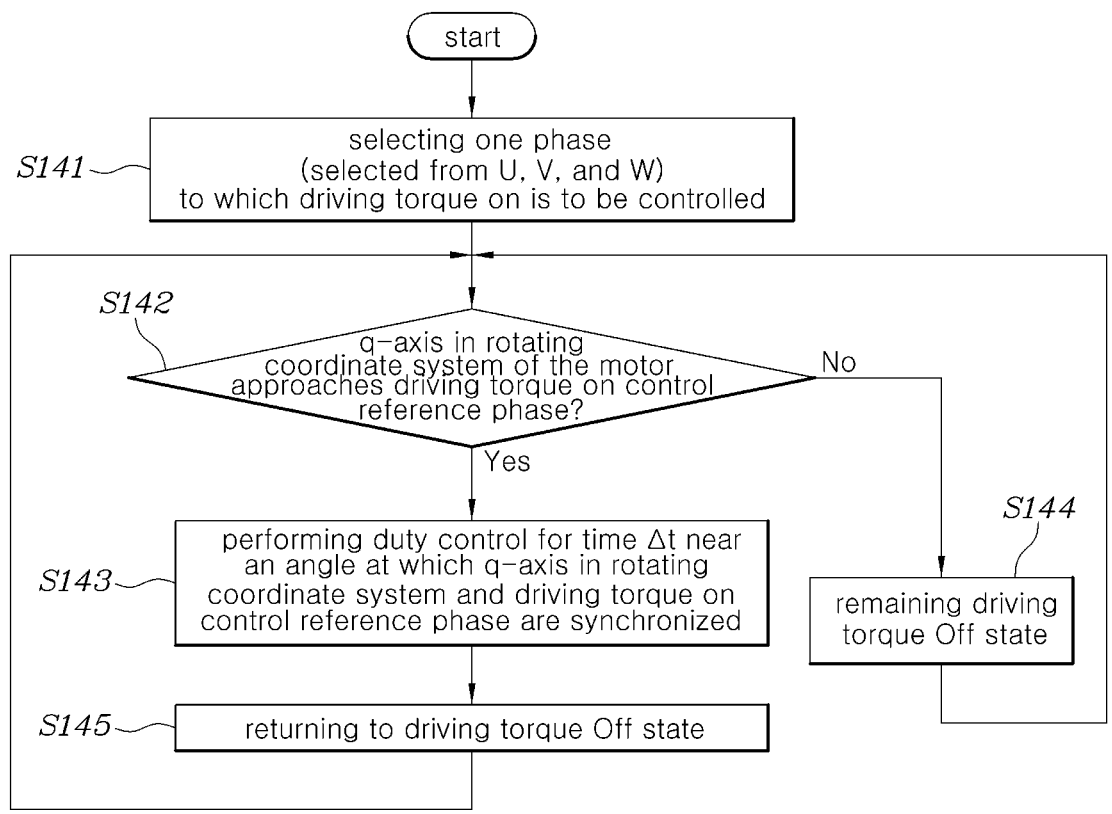
FIG. 5 is a flowchart illustrating in more detail a step of performing a torque on/off mode in a motor driving control method according to an embodiment of the present invention.
Figure 6:
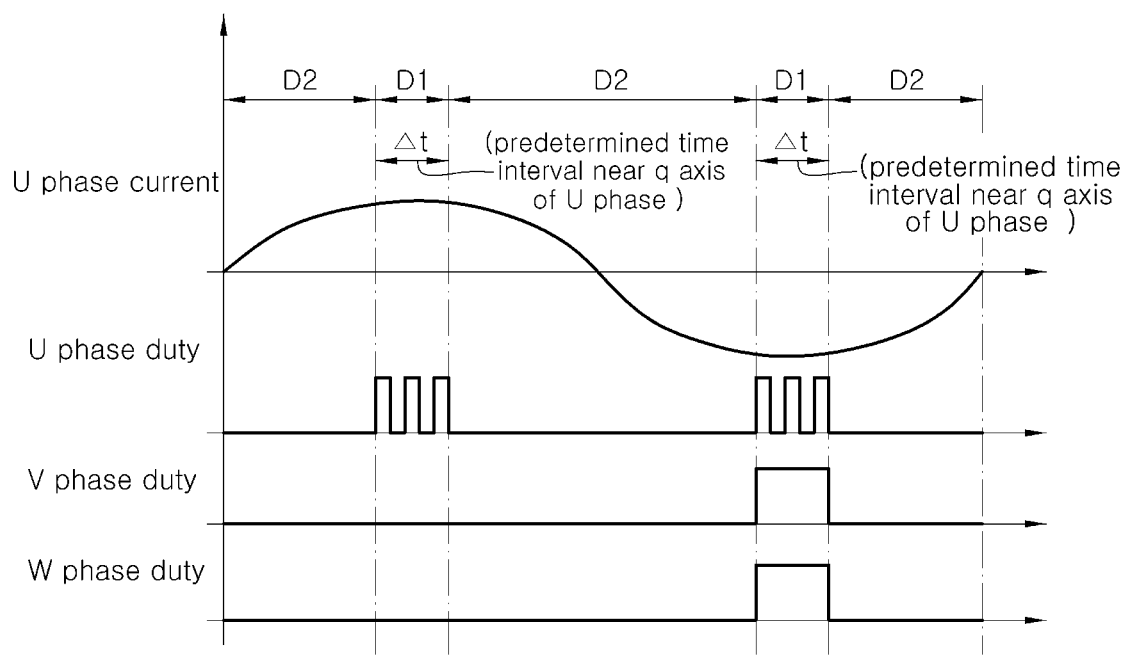
FIG. 6 is a diagram illustrating states of each phase in a motor torque on-section and a motor torque off-section applied in a motor driving control method and system according to an embodiment of the present invention.

FIG. 5 is a flowchart illustrating in more detail a step of performing a torque on/off mode in a motor driving control method according to an embodiment of the present invention. FIG. 6 is a diagram illustrating states of each phase in a motor torque on-section and a motor torque off-section applied in a motor driving control method and system according to an embodiment of the present invention. In addition, FIG. 7 is a graph showing the relationship between the q-axis of the motor rotation coordinate system in a motor torque on-section applied and one of three-phase axes to which a phase voltage is applied by a pulse width modulation scheme in the motor driving control method and system according to an embodiment of the present invention.

Figure 7:
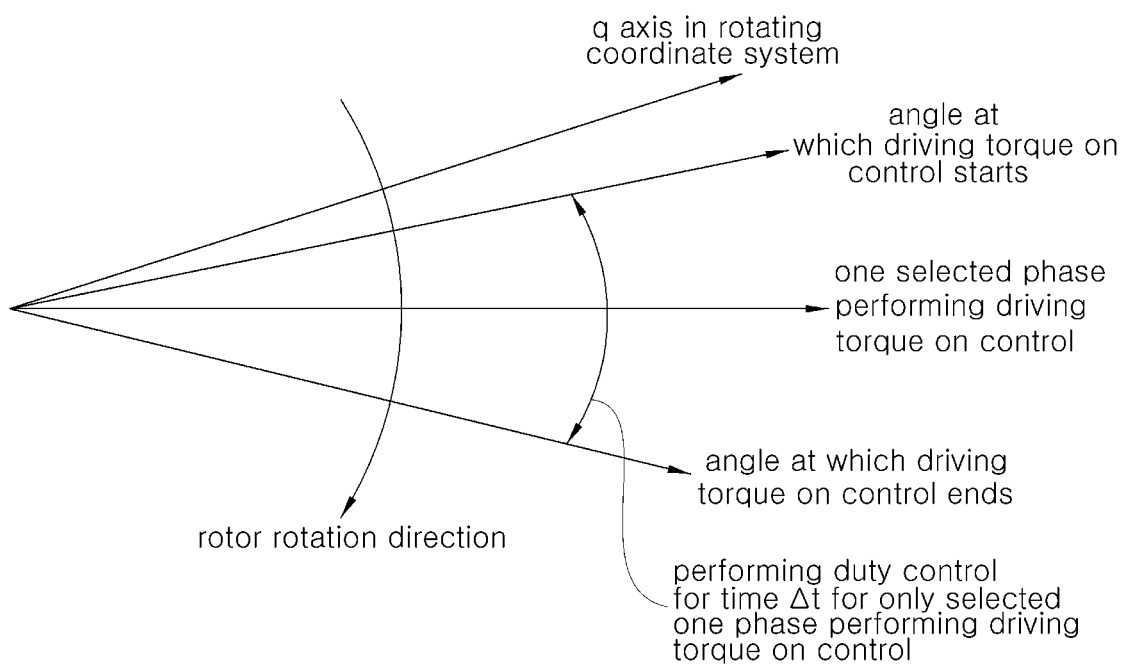
FIG. 7 is a graph showing the relationship between the q-axis of the motor rotation coordinate system in a motor torque on-section applied and one of three-phase axes to which a phase voltage is applied by a pulse width modulation scheme in the motor driving control method and system according to an embodiment of the present invention.

Referring to FIGS. 5 to 7, the torque on/off mode of the motor driving control method according to an embodiment of the present invention will be more clearly understood.

Referring to FIG. 5, the step of controlling the motor in the torque on/off mode (S14 of FIG. 3) includes a step of determining a target phase of one phase to which a phase voltage is applied, among multiple phases (u phase, v phase, and w phase) of the motor 10 in the on section D1 (S141), a step of checking whether the q-axis in a rotating coordinate system of the motor approaches an axis corresponding to a target phase in a fixed coordinate system (S142), a step of applying a phase voltage only to the target phase for a time Δt corresponding to the preset on section D1 by a pulse width modulation scheme (S143) when it is determined that the q-axis in the rotating coordinate system approaches the axis corresponding to the target phase in the fixed coordinate system at a predetermined angle, and a step of entering the off section D2 after the time Δt has elapsed (S145).

In general, when performing spatial vector pulse width modulation control used for controlling the motor, the q-axis is the point where the largest torque is generated and the d-axis is the point where no torque is generated in the rotating coordinate system of the motor. Using this motor characteristic, as shown in FIG. 6, in step S143, the on-section D1 is set where the motor torque is generated when the q-axis of the motor rotating coordinate system is near an axis corresponding to a target phase of one phase (u phase in FIG. 6) selected from u, v, and w phases of the fixed coordinate system, and the pulse width modulation control is performed for the selected one phase in the on-section D1, thereby generating the maximum possible torque for the selected one phase.

Herein, the remaining phases besides the selected one phase may be controlled to be always-on or always-off.

That is, as shown in FIG. 7, a time point at which the on section D1 starts may be a time point where the q-axis of the rotating coordinate system may be rotated to approach, to a predetermined angle, an axis corresponding to one selected from three phases of the selected fixed coordinate system, and a time point at which the on section D1 ends may be a time point where the q-axis of the rotating coordinate system may be rotated to be deviated, to a predetermined angle, past an axis corresponding to one phase selected from three phases of the fixed coordinate system. Accordingly, the start point and the end point of the on section D1 may be determined before and after the time point when the q-axis in the rotating coordinate system of the motor 10 meets the axis corresponding to the target phase in the fixed coordinate system, respectively.

As such, according to an embodiment of the invention, switching control of the inverter according to a predetermined pulse width modulation duty is performed only on one target phase so that a phase voltage corresponding to one phase in the on section is generated, and the switching control is not performed on the remaining phases, thereby avoiding inverter switching losses, conduction losses, and current ripple losses. That is, according to an embodiment of the present invention, the efficiency can be remarkably improved as compared to the method of performing switching control for all the multiple phases of the motor in the on section D1. In addition, since the switching control point on the target is controlled to synchronize the axis of the target phase to the q-axis of the rotating coordinate system of the motor, the maximum torque capable of being implemented as the target phase can be generated, thereby preventing the degradation of the speed following performance.

Referring again to FIG. 3, in a section in which the motor torque is set to off, switching elements included in the inverter 27 are all turned off (100% off duty), to cut off the driving current provided to the motor. That is, the voltage output converter 25 may output, to the inverter 27, a control signal for turning all the switching elements off, in a section in which the motor torque is maintained off.

The inverter 27 which provides torque (driving current) for driving a three-phase motor is usually implemented as a three-phase switching full bridge circuit using six switching elements (for example, IGBT, etc.). The current controller 23 compares the current command values with the measured motor driving current and then outputs voltage command values (DQ coordinates) that may reduce the difference. The voltage output converter 25 converts the voltage command values into three phase voltages and determines the duty of the switching elements so that the converted three phase voltages can be applied to the motor 10, thereby performing on/off control of the switching elements for each phase.

In the motor driving control method according to an embodiment of the present invention, the on/off control of torque repeats the on section and the off section at a regular period. Herein, in the section where the torque is turned on, the inverter switching elements are controlled so that the phase voltage is applied to one of multiple phases of the motor as described above, and in the section where the torque is turned off, the inverter switching elements are all turned off, thereby performing the torque on/off mode.

As another method of controlling the switching element of the inverter 27 in the torque off section D2, a method of performing on/off control on the switching element of each phase in the inverter 27 may be applied so that a driving voltage having a voltage magnitude substantially equal to the counter electromotive force generated in the motor 10 is generated. When the counter electromotive force of the motor 10 and the three-phase driving voltage of the inverter 27 are the same, a potential difference does not occur, and thus there may occur a zero current control state in which no current is supplied from the inverter 27 to the motor 10, that is, a state in which a motor torque is generated.

When the on/off control of the motor torque, that is, the torque on/off mode is performed (S14), in a section where the motor torque is set to off (S15), it is preferable to stop the integral control performed by the current controller 23 (S161). When the current controller 23 permits integrating the difference between the command values and the measured values in a section where the motor torque is off, a large output is applied from each controller due to an integral error at a time point when the torque is turned on again, thereby causing instability of the system, which results in significantly hindering the effect of torque on/off control due to the change in the speed command values and current command values. Of course, in a section where the motor torque is turned on (S15), it is preferable that the integral control is performed by the current controller 23 (S162).

As another example, it is also possible to apply a method of stopping the entire control operation and outputting the current command values as zero in the motor torque off section as soon as the motor torque is changed from on to off in the speed controller 21, instead of the method of stopping the integral control of the current controller 23 in the motor torque off section. That is, the three-phase output is cut off by causing the speed controller 21 to output the current command to zero, so that the integration due to the difference between the current command values and the measured current is interrupted in the current controller 23 in the torque off section where torque and output are not generated. Therefore, it is possible to prevent excessive output from occurring due to the accumulated error at a time point when the motor torque is turned on. Of course, when the motor torque is changed from the off state to the on state, it is possible to resume normal speed controller operation. Since the operation of the speed controller 21 is stopped during a section in which the motor torque is off, the output of the speed controller 21 at a time point when the motor torque is turned on again maintains the output value just before the motor torque is turned off, thereby securing the stability of speed control without unnecessary acceleration and deceleration.

Meanwhile, when the motor speed is out of a predetermined range or the current command output from the current controller 23 is out of a predetermined range, the torque on/off determiner 29 enables the typical control method in which the three-phase driving current of the inverter 27 is determined according to the current command values without performing the torque on/off mode (S17). As described above, when the speed of the motor 10 is equal to or higher than a predetermined speed, the load torque on the motor side increases (for example, in a fuel cell system, the air compressor increases load speed due to flow rate and pressure increase when the speed increases) so that the amount of deceleration generated in a section in which the torque of the motor 10 is off should be compensated in a section where the torque is on and thus an unnecessary amount of acceleration and deceleration occurs, and the resulting losses exceed switching losses and three-phase current ripple losses reduced by the torque on/off control. When the current command value is equal to or higher than a predetermined value, it may be regarded as a rapid acceleration section or a high-speed rotation state, and thus, the motor torque on/off repetitive control method may have a lower efficiency, compared to a typical continuous torque application method.

As one of the cases where the above-mentioned current command is out of a predetermined range, there may be a situation in which a regenerative braking torque is applied to the motor. When the regenerative braking is performed, the torque is applied in a direction opposite to the rotation direction, which is regarded as a state that the torque is negative. Therefore, it may be seen that the current command values are out of the range greater than 0 and less than B (positive) in step S132 in FIG. 3. It is preferable to stop on/off control of the motor torque even when the motor decelerates so that regenerative braking is performed. This is because recovering energy through continuous motor torque on control in the regenerative braking state is advantageous in terms of efficiency.

As described above, the motor driving control method and system according to various embodiments of the present invention can improve the efficiency of the system to which the motor is applied by reducing the power consumption of the motor. In particular, in a fuel cell vehicle including an air compressor to which a motor is applied, it is possible to improve the fuel cell system efficiency and the vehicle fuel economy by reducing power consumption by the air compressor.

In addition, the motor driving control method and system according to various embodiments of the present invention do not incur the cost due to the addition of separate hardware, and power consumption can be easily reduced by performing on/off control for the motor torque in a specific speed section or a specific torque section.

In particular, in the motor driving control method and system according to various embodiments of the present invention, when performing on/off control for the motor torque, it is possible to ensure the reduction in switching losses and current ripple losses of the inverter and significantly improve the efficiency, by using only one phase of multiple phases of the motor to obtain the maximum torque in the corresponding phase in a section where the motor torque is generated.

In addition, according to the motor driving control method and system, the efficiency can be improved not only in the constant speed driving state but also in the acceleration/deceleration driving state of the motor.

While the invention has been shown and described with respect to particular embodiments, it will be apparent to those skilled in the art that the present invention may be variously modified and changed without departing from the spirit of the invention provided by the following claims.

What is claimed is:

1. A motor driving control method for controlling a motor speed so that a speed measured value of a motor follows a speed command value, the method comprising:
    driving the motor by repeating an on section where a torque is generated in the motor and an off section where a torque is not generated in the motor at a regular period, based on the speed command value,
    wherein the driving includes performing switching control of an inverter according to a predetermined pulse width modulation duty on only one target phase so that a phase voltage corresponding to only one of multiple phases of the motor is generated in the on section; and
    wherein a start point and an end point of the on section are determined before and after a time point when a q-axis in a rotating coordinate system of the motor meets an axis corresponding to one phase to which the phase voltage is applied in a fixed coordinate system, respectively.

2. The method of claim 1, wherein the driving includes performing control so that phases to which a phase voltage is not applied, among the multiple phases of the motor, are maintaining fixed state, in the on section.

3. The method of claim 1, wherein the driving includes:
    determining a target phase corresponding to one phase to which a phase voltage is to be applied in the on section, among the multiple phases of the motor;
    determining whether the q-axis in the rotating coordinate system of the motor approaches an axis corresponding to the target phase in the fixed coordinate system; and
    applying the phase voltage only to the target phase by the predetermined pulse width modulation duty for a time corresponding to the on section, when it is determined that the q-axis in the rotating coordinate system of the motor approaches, to a predetermined angle, the axis corresponding to the target phase in the fixed coordinate system.

4. The method of claim 3, wherein applying the phase voltage includes performing control so that remaining phases other than the target phase are maintaining fixed states for a time corresponding to the on section.

5. The method of claim 1, wherein the driving includes performing control so that a driving current provided to the motor is substantially zero in the off section.

6. The method of claim 5, wherein the driving includes turning off a switching element included in the inverter providing the driving current to the motor in the off section.

7. The method of claim 5, wherein the driving includes controlling a switching element included in the inverter applying a driving voltage to the motor so that the driving voltage applied to the motor in the off section is substantially equal to a counter electromotive force of the motor.

8. A motor driving control system, comprising:
    a speed controller configured to determine a current command value for a driving current for driving a motor so that a speed measured value of the motor follows a speed command value for the motor;
    a current controller configured to determine a voltage command value for driving the motor so that a motor driving current measured value of an inverter provided to the motor follows the current command value;
    a voltage output converter configured to convert the voltage command value and perform on/off control of a switching element included in the inverter based on the voltage command value; and
    a torque on/off determiner configured to determine whether to perform a torque on/off mode for driving the motor by repeating an on section where a torque is generated in the motor and an off section where a torque is not generated in the motor at a regular period,
    wherein when the torque on/off determiner determines that the torque on/off mode is performed, the voltage output converter is configured to control the inverter so that a switching control of the inverter is performed according to a predetermined pulse width modulation duty on only one target phase so that a phase voltage corresponding to only one of multiple phases of the motor is generated in the on section; and
    wherein a start point and an end point of the on section are determined before and after a time point when a q-axis in a rotating coordinate system of the motor meets an axis corresponding to one phase to which the phase voltage is applied in a fixed coordinate system, respectively.

9. The system of claim 8, wherein when the torque on/off determiner determines that the torque on/off mode is performed, the voltage output converter is configured to control the inverter so that phases to which the phase voltage is not applied, among the multiple phases of the motor, are maintaining fixed states, in the on section.

10. The system of claim 8, wherein when the torque on/off determiner determines that the torque on/off mode is performed, for a determined time corresponding to the on section starting from a point in time when the q-axis in the rotating coordinate system of the motor approaches, to a predetermined angle, an axis corresponding to a target phase corresponding to one phase to which a phase voltage is applied in the on section in the fixed coordinate system, the voltage output converter is configured to control the switching element included in the inverter so that a phase voltage is applied only to the target phase by the predetermined pulse width modulation duty.

11. The system of claim 8, wherein, when the speed command value or the current command value is within a predetermined range, the torque on/off determiner is configured to determine that the torque on/off mode is performed.

12. The system of claim 8, wherein, when the torque on/off determiner determines that the torque on/off mode is performed, the voltage output converter is configured to control the switching element included in the inverter so that a driving current provided to the motor in the off section becomes substantially zero.

13. The system of claim 12, wherein, when the torque on/off determiner determines that the torque on/off mode is performed, the voltage output converter is configured to turn off the switching element included in the inverter in the off section.

14. The system of claim 12, wherein, when the torque on/off determiner determines that the torque on/off mode is performed, the voltage output converter is configured to control the switching element included in the inverter so that the phase voltage applied to the motor in the off section becomes substantially equal to a counter electromotive force of the motor.

15. The system of claim 12, wherein, when the torque on/off determiner determines that the torque on/off mode is performed, the speed controller is configured to determine the current command value to be zero when the torque of the motor is off.

16. A motor driving control method, comprising:
   determining a current command value for a driving current for driving a motor so that a speed measured value of the motor follows a speed command value for the motor;
   determining a voltage command value for driving the motor so that a motor driving current measured value of an inverter provided to the motor follows the current command value;
   converting the voltage command value and performing on/off control of a switching element included in the inverter based on the voltage command value;
   determining whether to perform a torque on/off mode for driving the motor by repeating an on section where a torque is generated in the motor and an off section where a torque is not generated in the motor at a regular period; and
   when the torque on/off mode is determined to be performed, controlling the inverter according to a predetermined pulse width modulation duty on only one target phase so that a phase voltage corresponding to only one of multiple phases of the motor is generated in the on section, and so that phases to which the phase voltage is not applied, among the multiple phases of the motor, are always-on or always-off, in the on section; and
   wherein a start point and an end point of the on section are determined before and after a time point when a q-axis in a rotating coordinate system of the motor meets an axis corresponding to one phase to which the phase voltage is applied in a fixed coordinate system, respectively.

* * * * *